US011009720B2

(12) United States Patent
Melera (10) Patent No.: US 11,009,720 B2
(45) Date of Patent: May 18, 2021

(54) EYEGLASSES WITH EXTENSIONS (71) Applicant: Frel Solutions Sagl, Agno (CH)

(72) Inventor: Francesca Melera, Agno (CH)

(73) Assignee: FREL SOLUTIONS SAGL, Agno (CH)

( * ) Notice: Subject to any disclaimer, the term of this patent is extended or adjusted under 35 U.S.C. 154(b) by 186 days.

(21) Appl. No.: 16/309,745

(22) PCT Filed: Jun. 15, 2017

(86) PCT No.: PCT/IB2017/053556
§ 371 (c)(1),
(2) Date: Dec. 13, 2018

(87) PCT Pub. No.: WO2017/216749
PCT Pub. Date: Dec. 21, 2017

(65) Prior Publication Data
US 2019/0137782 A1    May 9, 2019

(30) Foreign Application Priority Data

Jun. 16, 2016 (IT) .......................... 102016000062075

(51) Int. Cl.
*G02C 5/14* (2006.01)
*G02C 5/20* (2006.01)
(Continued)

(52) U.S. Cl.
CPC .............. *G02C 5/143* (2013.01); *G02C 3/006* (2013.01); *G02C 5/16* (2013.01)

(58) Field of Classification Search
CPC .......... G02C 3/006; G02C 5/14; G02C 5/143; G02C 5/20; G02C 3/003; G02C 5/001;
(Continued)

(56) References Cited

U.S. PATENT DOCUMENTS 2,539,922 A  1/1951 Nyberg
3,957,361 A  5/1976 Buccicone
(Continued)

FOREIGN PATENT DOCUMENTS

DE  10 2011 008 966 A1  7/2012
GB     2 448 797 A     10/2008
WO    2013/110834 A1    8/2013

OTHER PUBLICATIONS

Jestl, Markus (Authorized Officer), International Search Report and Written Opinion dated Oct. 4, 2017, in corresponding International PCT Application No. PCT/IB2017/053556 (10 pages).

*Primary Examiner* — Jordan M Schwartz
(74) *Attorney, Agent, or Firm* — MH2 Technology Law Group, LLP (57) ABSTRACT

Eyeglasses (2) comprise a pair of extensions (1) configured to be fixed each to a respective temple tip (42) of the eyeglasses (2). Each extension (1) comprises a body (5), having a first segment (53) adapted to be fixed to a respective temple tip (42) of an eyeglass (2), and a second segment (54) inclined with respect to the first segment (53). When the first segments (53) are connected each to the respective temple tip (42), the second segments (54) project from the respective temple tips (42) in directions (T) converging with each other. In this way, the second segments (54) can rest on the neck of a user and support the eyeglasses at the neck without the use of a chain. The extensions (1) are adaptable to temple tips (42) of different sizes.

20 Claims, 5 Drawing Sheets (51) Int. Cl.
*G02C 5/16* (2006.01)
*G02C 3/00* (2006.01)

(58) Field of Classification Search
CPC ........ G02C 5/006; G02C 5/008; G02C 5/146;
G02C 5/16
USPC .................................. 351/119–123, 140, 157
See application file for complete search history.

(56) References Cited

U.S. PATENT DOCUMENTS

| | | | |
|---|---|---|---|
| 5,987,702 A * | 11/1999 | Simioni | G02C 5/08 |
| | | | 16/228 |
| 6,644,808 B1 * | 11/2003 | Liu | G02C 3/003 |
| | | | 351/156 |
| 2003/0101542 A1 | 6/2003 | Mackay et al. | |
| 2005/0248716 A1 * | 11/2005 | Dietz | G02C 5/143 |
| | | | 351/41 |
| 2008/0158505 A1 * | 7/2008 | Schatz | G02C 3/003 |
| | | | 351/123 |

* cited by examiner

EYEGLASSES WITH EXTENSIONS

CROSS-REFERENCE TO RELATED APPLICATION(S)

This application is a national stage entry from International Application No. PCT/IB2017/053556, filed on Jun. 15, 2017, in the Receiving Office ("RO/IB") of the International Bureau of the World Intellectual Property Organization ("WIPO"), and published as International Publication No. WO 2017/216749 A1 on Dec. 21, 2017; International Application No. PCT/IB2017/053556 claims priority from Italian Patent Application No. 102016000062075, filed on Jun. 16, 2016, in the Italian Patent and Trademark Office ("IPTO"), the entire contents of all of which are incorporated herein by reference.

FIELD OF THE INVENTION

The present invention concerns the technical field of eyeglasses. The present invention is applicable to sight-correcting eyeglasses, sunglasses or any other type of eyeglasses. In particular, the present invention concerns eyeglasses to which a pair of extensions is applied.

BACKGROUND OF THE INVENTION

Known eyeglasses comprise a frame front and two temples, attached to the frame front, and configured to pass over the ears of a user and rest on them. The frame front comprises two lenses, or a single lens, through which the user can look to improve his/her vision. The frame front also comprises a nose pad configured to rest on the user's nose.

The temples, together with the nose pad, allow the eyeglasses to remain in position on the user's face when he/she uses the eyeglasses looking through the lenses. In particular, each temple has a temple tip at the distal end with respect to the frame front.

In some situations the user needs to frequently put on and take off the eyeglasses. This happens particularly in the use of reading eyeglasses, if the user has to alternately observe distant and close objects, and in the use of sunglasses, if there are sudden changes of light, for example while driving in and out of tunnels.

For the sake of ease of use, it is desirable that, when the user is not looking through the lenses, he doesn't need to remove the glasses but to simply to wear them in a different position.

A known solution is given by the use of a chain that joins the temples and allows the eyeglasses to be worn around the neck. The temples of the eyeglasses in particular are inserted in specific eyelets in the chain.

However, the same chain can be excessively long or excessively short depending on the physiognomy of the user. Chains that are too long may cause wide oscillations of the eyeglasses at the user's neck when he/she moves, with the risk of the eyeglasses striking external objects.

Moreover, eyeglass chains may easily entangle and hold the eyeglasses, causing discomfort to the user's neck.

SUMMARY OF THE INVENTION

An object of the present invention is to solve the aforementioned problems, in particular by limiting the possibility of movement of the eyeglasses when worn around the neck, and the consequent risk of impacts.

A further object of the invention is to allow eyeglasses to be worn at the neck avoiding the risk that the eyeglasses entangle with external objects.

These and other objects are accomplished by an eyeglass or a pair of eyeglasses according to any one of the claims in the following.

Advantageously, in the use configuration the second segments of each extension can rest behind the user's neck, supporting the eyeglasses. Consequently, the eyeglasses do not hang excessively down from the neck, and their mobility is reduced. Moreover, the eyeglasses can be supported on the neck without the presence of elements that can get entangled.

BRIEF DESCRIPTION OF THE DRAWINGS

Further features and advantages of the eyeglasses according to the present invention will become clear from the following description of a preferred embodiment, given by way of a non-limiting illustration, with reference to the attached figures, in which.

DETAILED DESCRIPTION

With reference to the attached figures, reference an extension for eyeglasses is globally designated with numeral 1. The extension 1, which is described more hereinafter, is applicable to eyeglasses 2.

The eyeglasses 2 comprise a frame front 3 and a pair of temples 4. The frame front 3 comprises at least one lens 31, like in the case of goggles, or plural lenses 31, preferably two. The frame front can also comprise one or more rims 32 to keep the lenses 31 in position, a bridge 33 joining the rims 32, two nose pads 34 configured to rest on a user's nose, and two end pieces 35 configured to connect to the temples 4. Such features are known to those skilled in the art and therefore are not described any further hereinafter.

The temples 4 mirror one another. Each temple 4 is attached to the frame front 3, for example at one of the end pieces 35. Preferably, each temple 4 is hinged to the frame front 3. Preferably, moreover, the temples 4 are adapted to switch between a closed position, in which the temples 4 lie close to the frame front 3, and an open position, in which the temples 4 are substantially parallel and spaced apart from one another in a longitudinal direction X.

In the following of the description, unless specified otherwise, the directions and the distances refer to the eyeglasses with the temples 4 in the open position.

In particular, each temple 4 comprises a stem 41 and a temple tip 42. The stem 41 is substantially rectilinear. The stem 41 is arranged between the frame front 3 and the respective temple tip 42. The temple tip 42 is thus in distal position with respect to the frame front 3. In the open position the temples 4, and in particular the stems 41, define a plane of the temples 4.

The temple tip 42 may be formed with different shapes and sizes. The temple tip 42 is generally defined by an end portion of the temple 4. If the stem 41 is made of metal, the temple tip 42 may comprise a plastic coating (not illustrated), to promote a pleasant contact with the head of a user.

The temple tip 42 may be inclined with respect to the stem 41 of the respective temple 4, and in the open position the temple tip 42 extends outside of the plane defined by the stems 41 of the temples 4. Preferably, each temple tip 42 forms an obtuse angle with the stem 41 of the respective temple 4 so as to fit around the ear of a user.

Each temple tip 42 has an end portion 43. The end portion 43, or possibly the entire temple tip 42, extends mainly along a main direction of extension Y. It should be noted that the temple tips 42 of the temples 4 extend in two distinct respective main directions of extension Y.

According to the illustrated embodiment, the temple tip 42 has a substantially flat end portion 43. In other words, the end portion 43 has a cross section that defines a first W and a second section direction Z, perpendicular to each other and perpendicular to the main direction of extension Y. In particular, the cross section of the end portion 43 extends in the second section direction Z for a shorter, or negligible, length with respect to an analogous length in the first section direction W. Generally, the second section direction Z extends towards the user's head, so that the end portion 43 offers a smooth surface to the user.

According to three different preferred standard types, temple tips 42 have a size in section equal, respectively, to 3 mm, 5 mm, and 13 mm. In particular, it should be observed that there are eyeglasses having temple tips 42 of a thin type and eyeglasses having temple tips 42 of a wide type.

In this description the section dimensions of a given element must always, unless indicated otherwise, be taken to mean the maximum dimensions of such an element that can be measured perpendicular to the main direction of extension Y of the temple tips 42, for example in the first section direction W or in the second section direction Z.

Figure 1:
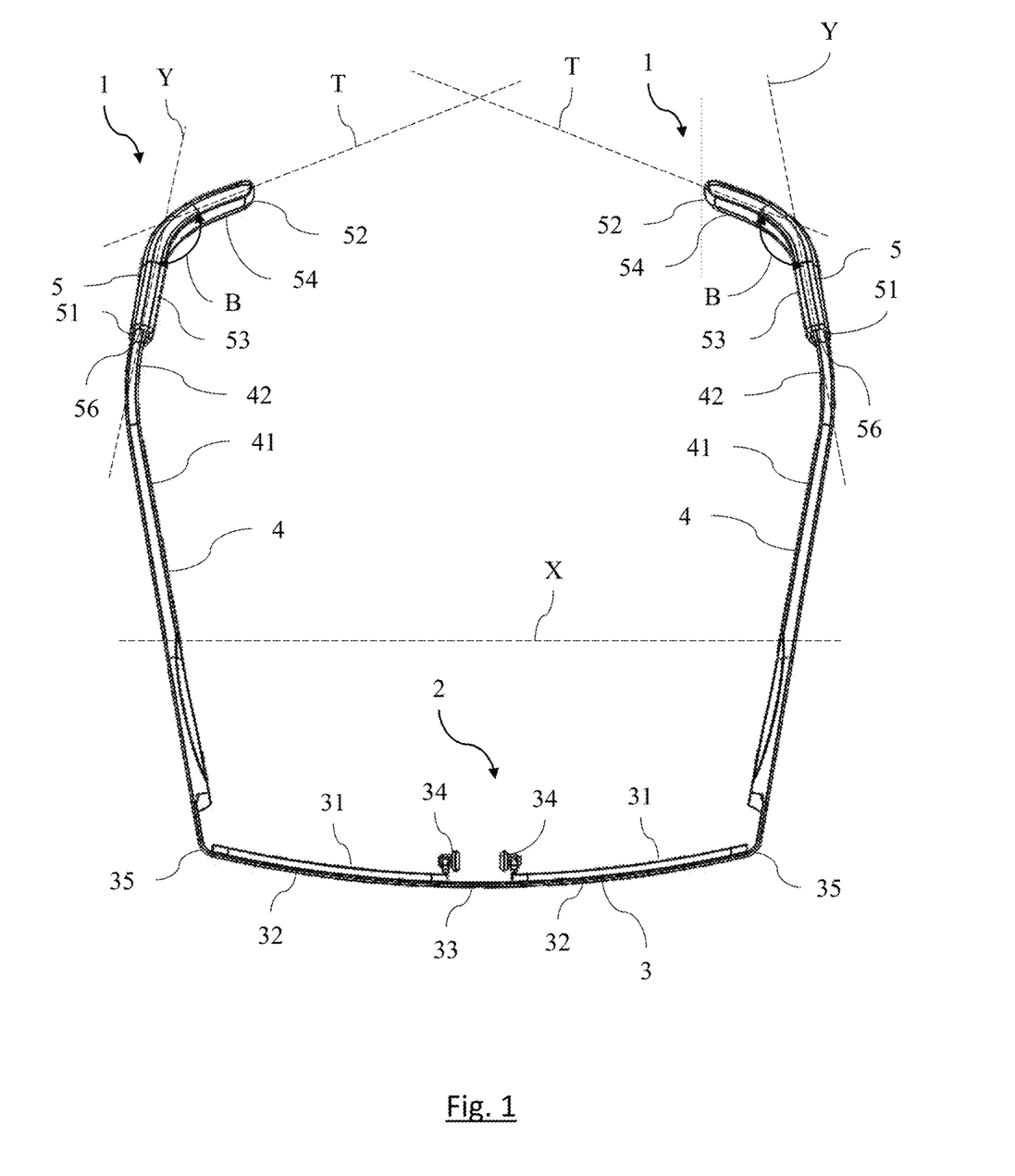
FIG. 1 shows a perspective view of eyeglasses according to the present invention.
Figure 2:
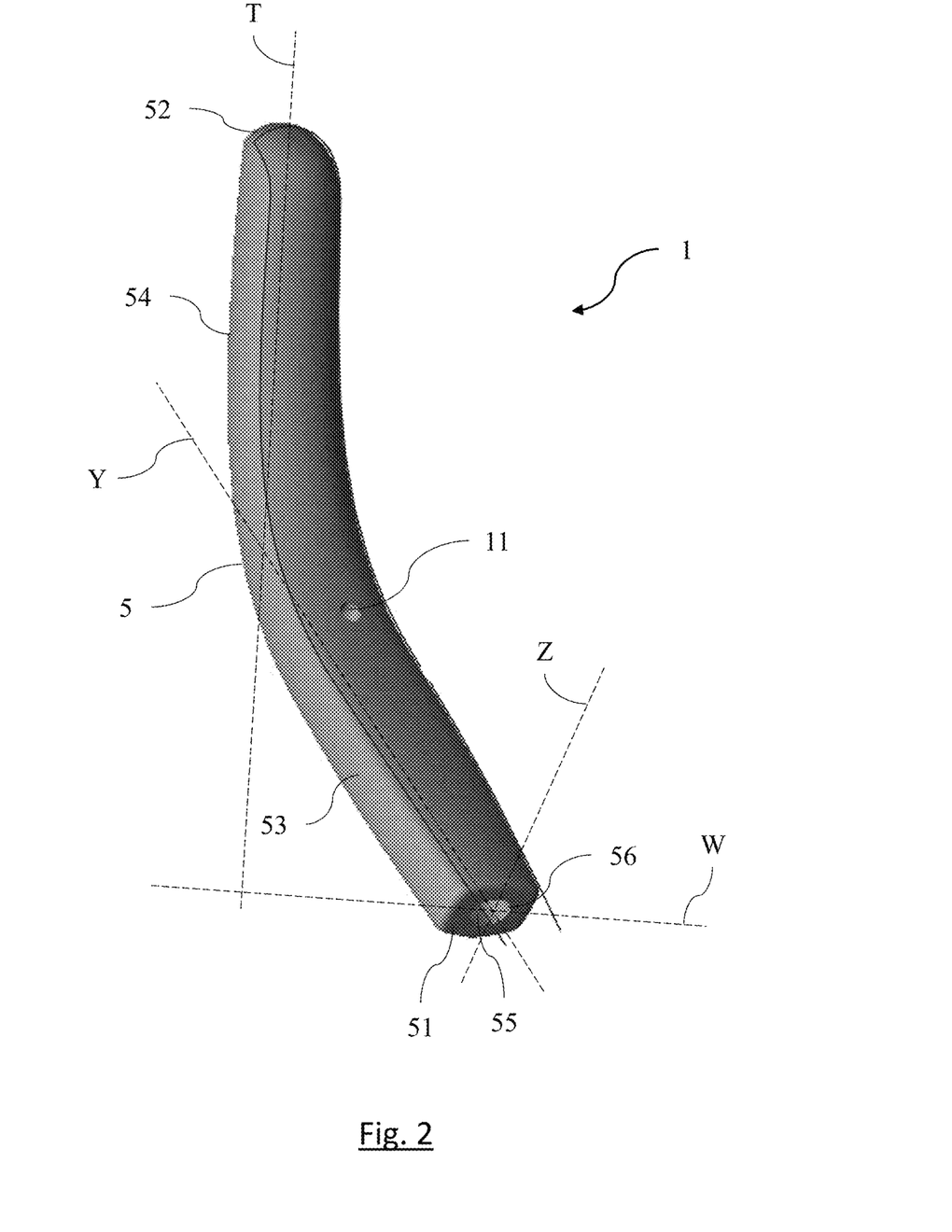
FIG. 2 shows a perspective view of one of the extensions applied to the temples of the eyeglasses of FIG. 1.
Figure 3:
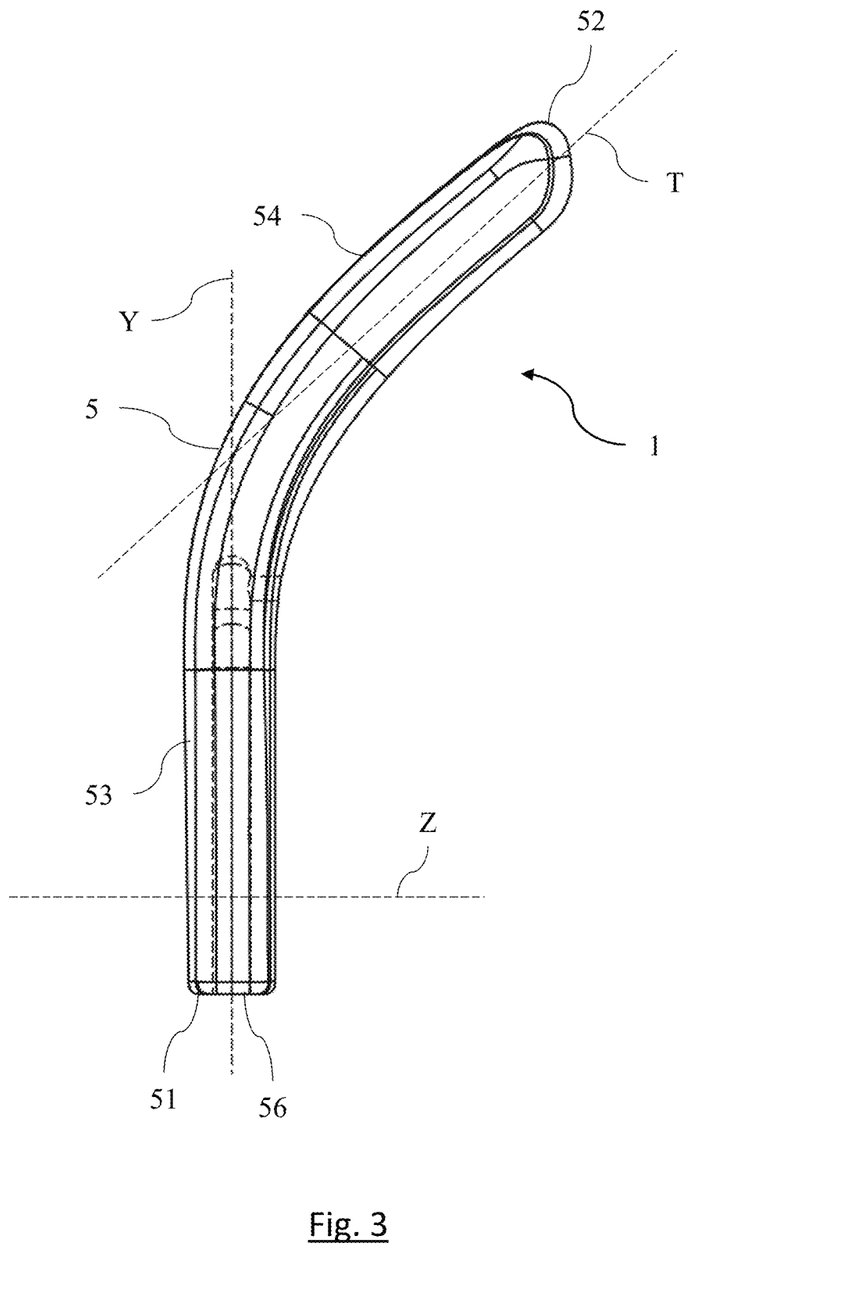
FIG. 3 shows a section view of the extension of FIG. 2, FIGS. 4 and 5 show a section view of the extension of FIG. 2 coupled with respective temple tips of eyeglass temples having different dimensions.

According to an aspect of the invention, two extensions 1 are applicable jointly to eyeglasses 2, as shown in FIG. 1. As will become clearer in the following of the description, each extension 1 is adaptable to at least two eyeglasses having distinct types of temple tips 42, i.e. a thin type and a wide type, in which the temple tips 42 according to the wide type have section dimensions greater with respect to temple tips 42 of the thin type.

For example, temple tips 42 can be considered to fall in the thin type if their section dimensions are less than 3.5 mm, and in the wide type if their section dimensions are greater than 4.5 mm.

The two extensions 1 have the same features, and mirror one another. In other words, the shape of either one of the extensions 1 can be obtained from the shape of the other extension 1 by symmetry with respect to a plane.

The two extensions 1 are mutually distinct and separate elements. The features indicated for a single extension 1 or for single mirroring parts of the eyeglasses 2 should be considered to be applicable to both extensions 1 or to both the corresponding mirroring parts of the eyeglasses 2.

Each extension 1 has a body 5. According to an embodiment, the body 5 is made of elastomeric material. More preferably, the body 5 is made of silicone rubber, manufactured for example by liquid silicone rubber moulding. Such a material has different advantageous features, including flexibility, resistance to low and high temperatures, to ultraviolet rays and to ageing. Advantageously, such a material may have an elongation at break comprised between 400% and 700%, a Shore A hardness comprised between 30 and 70, and a tensile strength comprised between 5 N/mm$^2$ and 12 N/mm$^2$, preferably between 9 N/mm$^2$ and 11 N/mm$^2$.

The body 5 extends between a first end 51 and a second end 52. The body 5 has a first segment 53 and a second segment 54. In particular, the first end 51 is located on the first segment 53, and the second end 52 is located on the second segment 54.

Each extension 1 is configured to be fixed to a respective temple tip 42 of the eyeglasses 2. In particular, the first segment 53 is adapted to be fixed to the temple tip 42.

In the following of the description, unless specified otherwise, the mutual positions of the eyeglasses 2 and of the extensions 1 are intended to be concomitant with the two extensions 1 being fixed to the respective temple tips 42 (always with the temples 4 in open position). In particular, the references to the main directions of extension Y, to the first W and to the second Z section direction refer to the position in which the two extensions 1 are fixed to the respective temple tips 42.

The first segment 53 extends mainly in the cited main direction of extension Y. Preferably, the first segment 53 has a cavity 55 configured to reversibly receive the temple tip 42. In particular, the cavity 55 receives the temple tip 42 along the main direction of extension.

The body 5 has an opening 56 at the first end 51 adapted to be passed through by the temple tip 42 to allow the insertion of the temple tip 42 in the cavity 55. The cavity 55 has a bottom 57 opposite the opening 56.

Preferably, the opening 56 has a substantially elliptical shape to retain the temple tip 42, in particular its end portion 43, and to prevent the rotation of the extension 1 with respect to the temple tip 42. In particular, the opening 56 has dimensions in the first section direction W greater with respect to its dimensions in the second section direction Z, in a similar manner as already described relative to the end portion 43 of the temple tip 42.

Advantageously, when the temple tip 42 is inserted in the cavity 55 through the opening 56, the orientation of the extension 1 is fixed.

Preferably, the opening 56 and/or the cavity 55 are elastically deformable to allow the insertion and the retention of the temple tip 42 in the cavity 55. Advantageously, it is necessary for the user to apply a force to withdraw the temple tip 42 from the cavity, and the risk of its accidental extraction during use is prevented.

According to the illustrated embodiment, the cavity 55 has a first portion 58 and a second portion 59. The first portion 58 of the cavity 55 is arranged between the opening 56 and the second portion 59 of the cavity 55. For example, in the preferred embodiment the second portion 59 of the cavity 55 is located at the bottom 57 of the cavity 55.

The opening 56 has section dimensions smaller with respect to the section dimensions of the first portion 58. The second portion 59 also has section dimensions smaller with respect to the section dimensions of the first portion 58, for example dimensions substantially equal to the section dimensions of the opening 56.

In detail, the first portion 58 of the cavity 55 defines a seat adapted to receive temple tips 42 of the wide type. The first portion 58 may be deformable to receive temple tips of the wide type. Moreover, the second portion 59 of the cavity 55 defines a seat adapted to receive temple tips 42 of the thin type. The extensions 1 are therefore suitable for being used both with eyeglasses 2 having temple tips 42 of the thin type, and with eyeglasses 2 having temple tips 42 of the wide type.

The opening 56 and the second portion 59 of the cavity 55 therefore each define a narrowing of the cavity 55 with respect to the first portion 58. The cavity 55 in particular is configured to prevent the access of temple tips 42 of the wide type to the second portion 59 of the cavity 55.

Temple tips 42 of the thin and wide type can be distinguished from one another since the temple tips 42 of the thin type are adapted to access to the second portion 59 of the cavity 55 whereas temple tips 42 of the wide type are adapted to access to the first portion 58 of the cavity 55 but not to the second portion 59. In particular, the temple tips 42 of the wide type have section dimensions greater than the section dimensions of the second portion 59 and/or of the opening 56.

In the preferred embodiment for example the opening 56 and the second portion 59 have section dimensions equal to 3 mm, and the first portion 58 of the cavity 55 has section dimensions equal to 5 mm.

Figure 4:
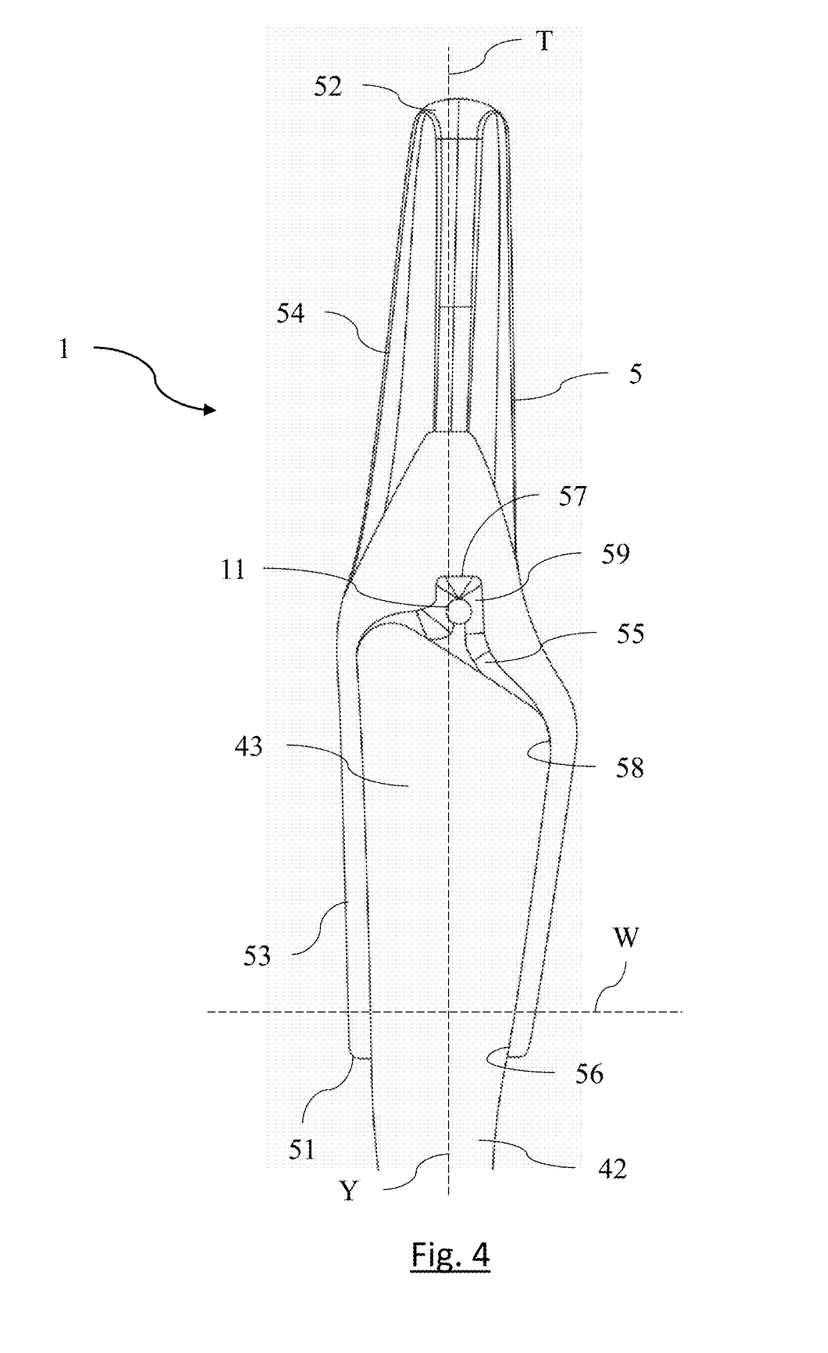

Advantageously, as shown in FIG. 4, wide temple tips 42 can pass through the opening 56, which is deformable, and be housed in the first portion 58 of the cavity 56. This is sufficient to ensure the stability of positioning of the temple tips of the wide type in the cavity 55.

For example, temple tips 42 according to the standard type with section dimensions of 5 mm are adapted to be housed in the first portion 58 without deforming the first portion 58 of the cavity 55. On the other hand, as shown in FIG. 4, temple tips 42 with section dimensions of 13 mm are adapted to be housed in the first portion 58 with deformation of the first portion 58 of the cavity 55.

Figure 5:
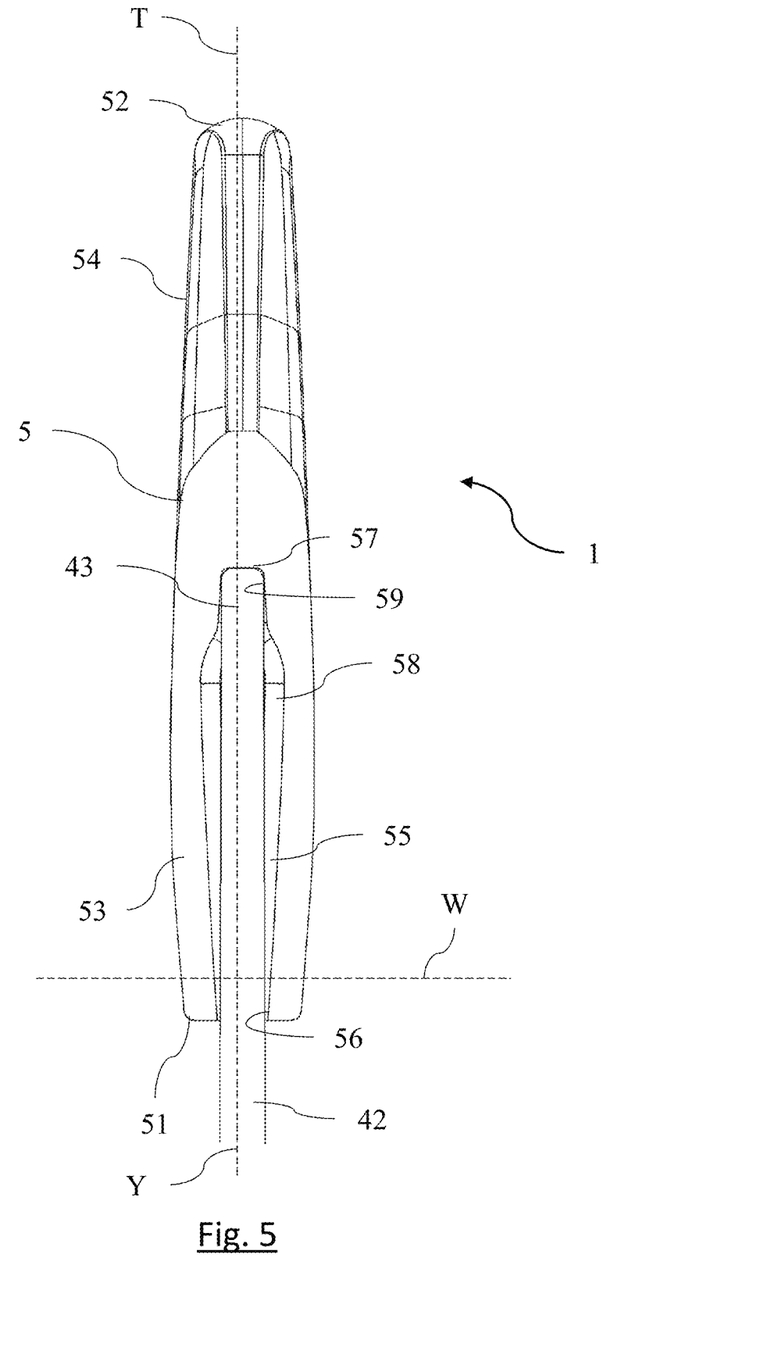

Moreover, as shown in FIG. 5, temple tips 42 of the thin type, for example according to the standard type having section dimensions equal to 3 mm, are adapted to be housed in the second portion 59 of the cavity 55. The temple tips 42 of the thin type therefore also pass through the opening 56 and the first portion 58 of the cavity.

Advantageously, the temple tips 42 of the thin type can be held stably in two distinct points, i.e. at the opening 56 and at the second portion 59 of the cavity 55.

It should be observed that extensions 1 equipped with a cavity 55 having substantially constant section are adapted to receive only temple tips 42 having section dimensions in a limited range of values.

Moreover, extensions 1 in which the cavity 55 defines a single narrowing can receive temple tips 42 both of the wide and thin type, but the thin temple tips 42 have excessive freedom of movement in the cavity 55. It is the case for example in which the opening 56 defines a narrowing with respect to the first portion 58 of the cavity 55, but in which there is no second portion 59 as described above. Thin temple tips 42 inserted in such a cavity 55 would indeed have the possibility of rotating inside the first portion 58, being held in position exclusively at the opening 56.

A cavity 55 shaped according to the invention, on the other hand, is adapted to receive both thin temple tips 42 and wide temple tips 42, ensuring stable positioning also of thin temple tips 42.

Preferably, the extension 1 has a hole 11 to allow air to exit from the cavity 55 during the insertion of the temple tip 42 in the cavity 55. Advantageously, the cavity 55 offers low mechanical resistance to the insertion of the temple tip 42.

The second segment 54 is inclined with respect to the first segment 53. The second segment 54 extends along a main direction of extension T. In particular, the second segments 54 extend along two respective main directions of extension T, distinct from one another. In detail, each second segment 54 has an extension comprised between 2 cm and 8 cm, preferably equal to 3 cm.

When the first segments 53 are connected each to the respective temple tip 42, the second segments 54 project from the respective temple tips 42. Moreover, in such a condition, the main directions of extension T of the second segments 54 converge with each other, as shown for example in FIG. 1, so that the second segments 54 can rest on a user's neck.

In particular, the distance between the temple tips 42 is greater than the distance between the second segments 54 of the respective extensions 1. Such distances are intended to be measured in the longitudinal direction X, and in particular in the plane of the temples 4, with the temples 4 in open position, and the temple tips 42 connected to the first segments 53 of the respective extensions 1.

Again in such a configuration, each second segment 54 is inclined with respect to the respective first segment 53 by an angle B between 110° to 160°, measured on the plane defined by the two temples 4, i.e. by the stems of the temples 41. Such an angle B in particular is identified by the projections of the first segments 53 and of the respective second segments 54 on such a plane. In other words, the angle B is defined by the projections on the plane of the temples 4 of the main directions of extension T of the second segments 54 and of the main directions of extension Y of the respective temple tips 42.

Advantageously, whereas in the absence of extensions 1 the neck of a user can easily pass through the space comprised between the temple tips 42 of the eyeglasses 2, in the presence of extensions 1 there is no longer sufficient space for the passage of the neck between the extensions 1, and the eyeglasses do not fall from the neck.

It should be noted that, in order to ensure the orientation described above of the second segments 54 with respect to the temple tips 42, i.e. with respect to the first segments 53, the main direction of extension T of each second segment 54 lies in a plane substantially perpendicular to the first section direction W of the respective temple tip 42, i.e. of the respective first segment 53.

Advantageously, as described above, the rotation of the extension 1 with respect to the temple tip 42 is prevented. Consequently, the orientation of the second segment 54 is fixed. In particular, when the user wears the eyeglasses around the neck, such orientation at least partially faces behind the user's neck even if, in non-illustrated embodiments of the invention, the second segment 54 can also develop in part downwards, i.e. behind the user's shoulders.

The eyeglasses 2 according to the invention can be used by firstly fixing each extension 1 to the respective temple tip 42. In particular, the fixing takes place by inserting the end portion 43 of the temple tip 42 in the cavity 55 through the opening 56. In the insertion, the extension 1 is oriented with respect to the temple tip 42 thanks to the substantially flat shape of the end portion 43 of the temple tip 42 and to the elliptical shape of the opening 56.

Thereafter, a user can wear the eyeglasses 2 with the extensions 1 on the face, with the temple tips 42 resting on the ears, or he/she can wear the eyeglasses 2 around the neck, with the second segments 54 of the extensions 1 resting behind the neck.

The invention claimed is:

1. Eyeglasses, comprising:
   a frame front;
   a pair of temples, wherein each temple is attached to the frame front and has a respective temple tip; and
   a pair of extensions configured to be removably fixed each to a respective temple tip, wherein each extension comprises a body extending between a first end and a second end;
   each body comprising:

a first substantially rigid segment configured to be fixed to the respective temple tip, the first substantially rigid segment of each extension having a cavity configured to receive the respective temple tip;

an opening at the first end configured to be passed through by the respective temple tip to allow insertion of the respective temple tip into the cavity and removal therefrom; and a second substantially rigid segment inclined with respect to the first substantially rigid segment and extending along a respective main direction of extension;

wherein when the first substantially rigid segments are connected each to the respective temple tip, the second substantially rigid segments project from the respective temple tips, and the main directions of extension of the second substantially rigid segments converge with each other so that the second substantially rigid segments can rest on a neck of a user, wherein the cavity has a first portion and a second portion, wherein the first portion of the cavity is arranged between the opening and the second portion of the cavity, wherein the opening has section dimensions in width and height smaller than the section dimensions in width and height of the first portion, and wherein the second portion has section dimensions in width and height smaller than the section dimensions in width and height of the first portion.

2. The eyeglasses of claim 1, wherein each extension has a hole to allow air to exit from the cavity during the insertion of the respective temple tip.

3. The eyeglasses of claim 1, wherein the opening and/or the cavity are elastically deformable to allow insertion and retention of the respective temple tip in the cavity.

4. The eyeglasses of claim 1, wherein the opening of each extension has an elliptical shape.

5. The eyeglasses of claim 1, wherein each cavity has a bottom opposite the opening, and wherein the second portion is located at the bottom.

6. The eyeglasses of claim 1, wherein each opening has the same section dimensions in width and height as the section dimensions in width and height of the second portion of the cavity.

7. The eyeglasses of claim 1, wherein the body of each extension is made of elastomeric material.

8. The eyeglasses of claim 1, wherein each second substantially rigid segment has an extension between 2 centimeters (cm) and 8 cm.

9. The eyeglasses of claim 1, wherein the distance between the temple tips is greater than the distance between the second substantially rigid segments of the respective extensions when the eyeglasses are in an open, as-worn position.

10. The eyeglasses of claim 1, wherein each second substantially rigid segment is inclined with respect to a respective first substantially rigid segment by an angle between 110° to 160°, measured on a plane defined by the two temples.

11. The eyeglasses of claim 1, wherein each temple tip has a substantially flat end portion, and wherein the opening of each extension has an elliptical shape to hold the end portion and to prevent rotation of the extension with respect to the respective temple tip.

12. The eyeglasses of claim 1, wherein the opening and the second portion of the cavity each define a narrowing of the cavity with respect to the first portion of the cavity.

13. The eyeglasses of claim 1, wherein the first portion of the cavity defines a first seat configured to receive temple tips of a wide type, wherein the second portion of the cavity defines a second seat configured to receiving temple tips of a thin type, and wherein the cavity is shaped to prevent access of the temple tips of the wide type to the second portion of the cavity.

14. The eyeglasses of claim 13, wherein the first portion of the cavity is deformable to receive the temple tips of the wide type.

15. A pair of eyeglasses, comprising:

first eyeglasses of claim 13; and second eyeglasses of claim 13;

wherein the first eyeglasses have temple tips of the wide type and the second eyeglasses have temple tips of the thin type, and wherein the temple tips of the first eyeglasses have section dimensions in width and height greater than the section dimensions in width and height of the temple tips of the second eyeglasses.

16. The eyeglasses of claim 1, wherein each second substantially rigid segment has an extension equal to 3 centimeters (cm).

17. A pair of eyeglasses, comprising:

first eyeglasses of claim 14; and second eyeglasses of claim 14;

wherein the first eyeglasses have temple tips of the wide type and the second eyeglasses have temple tips of the thin type, and wherein the temple tips of the first eyeglasses have section dimensions in width and height greater than the section dimensions in width and height of the temple tips of the second eyeglasses.

18. The eyeglasses of claim 1, wherein the opening defines a narrowing of the cavity with respect to the first portion of the cavity.

19. The eyeglasses of claim 1, wherein the second portion of the cavity defines a narrowing of the cavity with respect to the first portion of the cavity.

20. The eyeglasses of claim 1, wherein the first portion of the cavity defines a first seat configured to receive temple tips of a wide type, and wherein the second portion of the cavity defines a second seat configured to receiving temple tips of a thin type.

* * * * *